(12) United States Patent
Olive

(10) Patent No.: US 8,136,764 B2
(45) Date of Patent: Mar. 20, 2012

(54) DEVICE FOR OPPOSING SLOSHING IN A FLEXIBLE TANK

(75) Inventor: Richard Olive, Martigues (FR)

(73) Assignee: Eurocopter, Marignane Cedex (FR)

( * ) Notice: Subject to any disclaimer, the term of this patent is extended or adjusted under 35 U.S.C. 154(b) by 1146 days.

(21) Appl. No.: 11/920,148

(22) PCT Filed: May 16, 2007

(86) PCT No.: PCT/FR2007/000841
§ 371 (c)(1),
(2), (4) Date: Nov. 29, 2007

(87) PCT Pub. No.: WO2008/000923
PCT Pub. Date: Jan. 3, 2008

(65) Prior Publication Data
US 2009/0308875 A1     Dec. 17, 2009

(30) Foreign Application Priority Data

Jun. 30, 2006 (FR) ....................... 06 05933

(51) Int. Cl.
*B64D 37/02* (2006.01)
(52) U.S. Cl. .................. 244/135 B; 244/172.2; 220/562
(58) Field of Classification Search .............. 244/135 B, 244/135 C, 135 R, 172.2, 172.3; 220/562, 220/563, 719
See application file for complete search history.

(56) References Cited

U.S. PATENT DOCUMENTS

| | | | |
|---|---|---|---|
| 3,101,921 A * | 8/1963 | Price .................. | 244/135 B |
| 3,447,768 A * | 6/1969 | Mcqueen ................. | 244/135 R |
| 3,658,205 A * | 4/1972 | Kassravi ................. | 220/562 |
| 3,747,800 A | 7/1973 | Viland | |
| 3,977,379 A | 8/1976 | Weissenbach | |
| 4,213,545 A | 7/1980 | Thompson et al. | |
| 4,214,721 A * | 7/1980 | Burhans et al. ............ | 244/135 B |
| 4,722,655 A * | 2/1988 | Bonerb ................... | 414/288 |
| 5,056,493 A | 10/1991 | Holzer | |
| 5,437,384 A * | 8/1995 | Farrell .................. | 220/1.5 |
| 6,019,316 A * | 2/2000 | Sarlin et al. ............. | 244/135 R |
| 6,622,966 B1 | 9/2003 | McConnell, Sr. | |
| 2006/0207774 A1 * | 9/2006 | Payassis ................. | 169/53 |
| 2010/0202849 A1 * | 8/2010 | Jerich ................... | 410/2 |

FOREIGN PATENT DOCUMENTS

| | | |
|---|---|---|
| CH | 242087 | 4/1946 |
| DE | 198 23 227 | 12/1999 |
| FR | 2 829 103 | 3/2003 |
| WO | WO 2005/014394 | 2/2005 |

* cited by examiner

*Primary Examiner* — Joshua J Michener
*Assistant Examiner* — Brian M O'Hara
(74) *Attorney, Agent, or Firm* — Brooks Kushman P.C.

(57) ABSTRACT

A device (D) for opposing sloshing in a flexible tank (21) provided with a top cushion (22) and having a bottom (23) and a plurality of sides (24), the device includes at least first and second ties (1 and 2). The first and second ties (1 and 2) are secured respectively to first and second edges (221 and 222) of the cushion, with the first edge (221) being opposite from the second edge (222). The device is remarkable in that it includes main distributor elements (10) for blocking only one of the ties when the tension exerted on that tie is greater than the tension exerted on the other tie, the first and second ties (1 and 2) also being secured to the main distributor unit (10).

29 Claims, 2 Drawing Sheets

DEVICE FOR OPPOSING SLOSHING IN A FLEXIBLE TANK

The present invention relates to a device for opposing sloshing in a flexible tank arranged in a vehicle, e.g. a rotorcraft.

BACKGROUND OF THE INVENTION

A flexible tank on board a vehicle may contain kerosene for feeding to a rotorcraft gas turbine engine, for example, or may contain water for fire-fighting if the vehicle is a water-bombing helicopter, in particular.

When the vehicle moves, the liquid itself moves inside the tank leading to the liquid level rising on one side of the tank and falling on the other side of the tank, resulting in sloshing that can lead to numerous inconveniences. Such sloshing can lead to hammering that might damage the structure of the vehicle, or to a shift in its center of gravity, which is harmful to the balance of the vehicle and makes it difficult to pilot, particularly if it is a helicopter type rotorcraft.

Document U.S. Pat. No. 6,622,966 discloses a first device having a ballasted float placed on the liquid contained in the tank. The purpose of the float is to keep the liquid level so that its surface remains parallel to the bottom of the tank. In that way, the sloshing phenomenon is prevented from occurring.

Nevertheless, it is possible that a sudden movement of the vehicle can overcome the force exerted by the float, thereby reducing its effectiveness.

Document WO 2005/014394 discloses a second device having a plate inserted inside a tank. The plate also co-operates with two wormscrews controlled by a motor so as to enable the plate to move vertically. Thereafter, the motor drives the wormscrews to move the plate so that it is held against the surface of the liquid in such a manner as to keep said surface horizontal, in the frame of reference of the vehicle, naturally.

Nevertheless, in order to operate, that second device needs electrical power to be delivered thereto from outside the device. Unfortunately, power is a particularly precious resource on board a vehicle, in particular an aircraft, and that can impede implementing the second device.

Furthermore, the motor needs to be controlled properly to ensure that the plate remains continuously in a suitable position, both while the vehicle is being used and while the tank is being filled. This control needs to be extremely accurate and involves complex control relationships and/or control and monitoring means that are onerous, both from a financial point of view and from the point of view of the weight of the device.

Finally, document FR 2 829 103 discloses a third device in which the top portion of a tank is put under pressure by an actuator or by tensioners.

The use of tensioners presents the disadvantage of not enabling the pressure exerted on the surface of the liquid to be adjusted while the vehicle is in use. Consequently, if the level of the liquid is modified during said use, the action of the tensioners runs the risk of being found to be insufficient.

Furthermore, the use of actuators presents the above-mentioned potential drawbacks, and in particular those associated with making such a device difficult to control.

OBJECTS AND SUMMARY OF THE INVENTION

An object of the present invention is to propose an active anti-sloshing device that enables the above-mentioned drawbacks to be overcome and that requires neither the use of a source of electricity nor the use of control relationships.

According to the invention, a device for opposing sloshing in a flexible tank that is provided with a top cushion and that has a bottom and a plurality of sides, itself comprises at least first and second ties, e.g. straps. These first and second ties are secured respectively to first and second edges of the cushion, the first edge being opposite from the second edge. The device is remarkable in that it further comprises a main distributor means for blocking only one of the ties when the tension exerted on said tie exceeds the tension exerted on the other tie, the first and second ties also being secured to the main distributor means.

Consequently, if the liquid moves to any considerable extent, one of the edges of the cushion will be raised by the liquid, while the other edge moves downwards. The tension on one of the ties will then increase while the tension exerted on the other tie will decrease.

Nevertheless, the main distributor means will prevent such sloshing by blocking the tie on which the greater tension is being exerted. In this way, the main distributor means will force the top cushion to remain horizontal in the frame of reference of the vehicle.

In this context, it should be understood that the tank is disposed in a vehicle having a frame of reference comprising a longitudinal axis going from the rear towards the front of the vehicle, a transverse axis going from left to right, and an elevation axis disposed in the height direction of the vehicle. The transverse and longitudinal axes thus define a plane corresponding to the horizontal, while the elevation axis defines the vertical. For a rotorcraft, the longitudinal axis thus passes through its nose and its tail rotor.

Advantageously, the main distributor means comprises first and second automatic winders acting on the first and second ties respectively, which ties are then arranged on the smaller-diameter peripheries of the first and second winders. Furthermore, the larger-diameter peripheries of the first and second winders are optionally cogged, with the winders optionally co-operating with each other via cogwheels or via their cog peripheries, for example.

Thus, the first and second winders are mounted to rotate in opposite directions, one winder turning counterclockwise to wind in the tie to which it is connected while the other winder turns clockwise to wind in the tie to which it is connected.

Furthermore, the first and second automatic winders are arranged on a pendular support in the form of an upside-down T-shape, the pendular support being fitted with a vertical shaft carrying a horizontal shaft, said first and second automatic winders being disposed at the free ends of the horizontal shaft.

In this configuration, the vertical shaft is secured to the middle of the horizontal shaft, while extending perpendicularly thereto, so as to form the pendular support.

In addition, the first and second automatic winders are disposed symmetrically about the vertical shaft.

Consequently, if one of the first and second edges of the cushion tends to move significantly under the effect of a movement of the liquid contained in said tank, the main distributor means includes blocker means for blocking the automatic winder connected to the edge of said cushion that tends to move. Such a large movement of an edge of the top cushion leads to the top cushion being inclined by more than 5° relative to the bottom of the tank.

In a first embodiment, for the tank subjected to three distinct operating stages, namely a filling stage, an emptying stage, and an intermediate stage between the filling stage and the emptying stage, the main distributor means essentially opposes a sloshing effect during the filling and intermediate stages. Thus, for one of the first and second edges of the top cushion tending to rise during a large movement of the liquid contained in the tank, the blocker means blocks the automatic winder that is connected via a tie to the edge of the top cushion that is tending to rise under the effect of the movement of the liquid.

Consequently, each tie having an end zone fastened to the top cushion, the end zone goes downwards away from the top cushion towards the bottom of said tank. This end zone is thus directed towards the bottom of the tank.

In contrast, in a second embodiment, the main distributor means essentially opposes a sloshing effect during the emptying stage. For one of the first and second edges of the top cushion tending to move downwards during a large movement of the liquid contained in the tank, e.g. under the effect of emptying, the blocker means block the automatic winder connected via a tie to the edge of the top cushion that is tending to move downwards under the effect of the movement of the liquid.

Consequently, for each tie having an end zone fastened to the top cushion, said end zone extends from the cushion going away from the bottom of the tank.

Advantageously, the blocker means is provided with a first stationary abutment that co-operates with the first winder, and with a second stationary abutment that co-operates with the second winder.

The anti-sloshing device of the invention is purely mechanical and does not require any control relationship to be implemented. If the first edge of the cushion tends to move considerably under the action of the liquid and induces tension on the first tie greater than the tension that is exerted on the second tie, then the pendular support pivots, tilting towards the first edge. The first abutment then co-operates with the first winder to block the first tie, the first abutment blocking the first winder by coming into contact with a cog in the cogged larger-diameter periphery thereof. In this way the cushion remains accurately in a horizontal position and prevents any sloshing effect of the liquid.

The device is completely symmetrical and thus operates in identical manner regardless of the nature of the sloshing. The blocker means has a second stationary abutment that co-operates with the second automatic winder when the pendular support pivots under the effect of tension exerted on the second tie, said tension being greater than the tension exerted on the first tie. For the second automatic winder being provided with a cogged larger-diameter periphery, the second stationary abutment blocks the second automatic winder by making contact with a cog of its cogged larger-diameter periphery.

Furthermore, the main distributor means is advantageously provided with a winding-out limiter that co-operates with the first and second automatic winders to reduce the vertical movement of the top cushion of the tank so as to control its volume and thus control the quantity of liquid that can be stored. The winding-out limiter then limits the angle through which the automatic winders can turn, thereby preventing the first and second ties being wound out excessively, thus limiting the movement of the top cushion.

Furthermore, although it is appropriate to avoid a sloshing effect when the liquid contained in the tank moves strongly, it is not essential for the main distributor means to act during a small movement of the liquid.

Consequently, in a first variant of the embodiments, the main distributor means include brake means for braking the pendular support to avoid a winder being blocked by the blocker means if the liquid contained in the tank is moving by a small amount only, where movement of the liquid is considered to be small if it leads to the top cushion being inclined by less than approximately 5° relative to the bottom of the tank.

The brake means then comprise a first spring of adjustable stiffness for braking movement of the pendular support towards a first edge of the cushion, and a second spring of adjustable stiffness for braking movement of the pendular support towards the second edge of the cushion.

Furthermore, in a second variant of the embodiments, the first and second edges of the cushion are ideally disposed in a manner that is symmetrical about the main distributor means.

Nevertheless, depending on the surroundings of the tank, it is not essential for the first and second edges of the cushion to be disposed symmetrically relative to the main distributor means, since proper operation of the device relies merely on the ties moving and not on their respective lengths. Thus, the main distributor means may optionally be situated on the floor of the vehicle that supports the bottom of the tank, and thus close to the first edge and remote from the second edge, for example. Thus, the first and second edges of the top cushion are disposed asymmetrically relative to the main distributor means in a third variant of the embodiments.

Furthermore, when the device is arranged on an aircraft, e.g. a rotorcraft, having a nose and a tail, the main distributor means together with the first and second ties are disposed on a longitudinal axis passing via said nose and said tail, or else on a transverse axis perpendicular to said longitudinal axis. Consequently, all of the elements of the device, i.e. the ties, the blocker means, the automatic winders, the brake means, and the pendular support, are disposed substantially on the same longitudinal or transverse axis.

In a fourth variant of the embodiments, the device comprises solely first and second ties together with main distributor means.

Nevertheless, such a device is restricted to opposing sloshing in one direction only. It can be useful under certain circumstances for the device to operate in all directions.

In a fifth variant of the embodiments, the device thus includes secondary distributor means connected to third and fourth ties respectively connected to opposite edges of the cushion, the secondary distributor means being identical to the main distributor means. The secondary distributor means and the third and fourth sides are then disposed on an axis perpendicular to the axis on which the main distributor means and the first and second ties are disposed.

In the same manner, in a sixth variant of the embodiments, the device comprises at least main distributor means in accordance with the first embodiment for combating a sloshing effect during the filling and intermediate stages, together with at least main distributor means in accordance with the second embodiment for combating a sloshing effect during the emptying stage.

Furthermore, in order to optimize its operation and depending on the arrangement of the main distributor means, the device includes deflector means serving to control the paths followed by the ties so that the ties are properly positioned, in particular as a function of the particular embodiment to be implemented. Finally, in a seventh variant of the embodiments, the cushion advantageously projects from the sides of the tank, the first and second ties being connected to portions of the cushion that project from the tank.

BRIEF DESCRIPTION OF THE DRAWINGS

The invention and its advantages appear in greater detail in the context of the following description which relates to preferred embodiments given without any limiting character and described with reference to the accompanying figures, in which.

Figure 1:
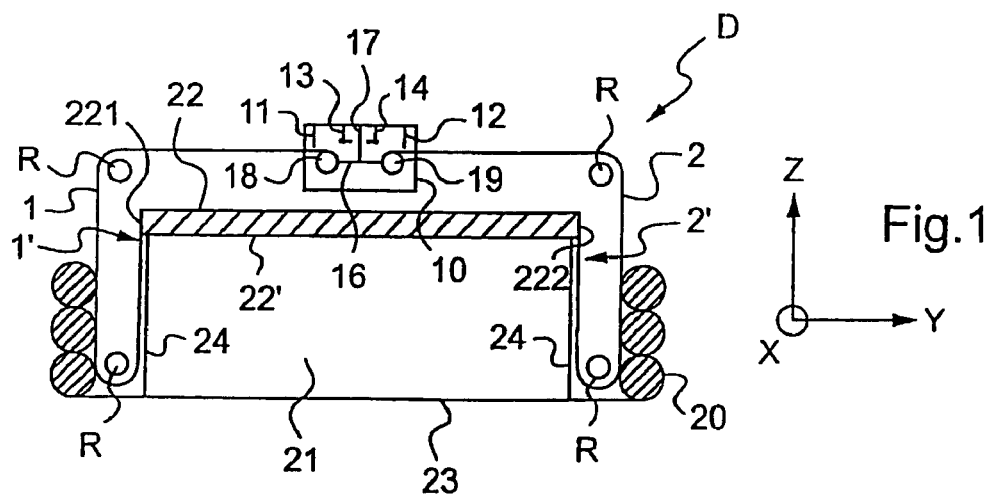
FIG. 1 is a section of the device in a first embodiment of the invention.

Elements present in two or more distinct figures are given a single reference numeral in all of them.

MORE DETAILED DESCRIPTION

FIG. 1 is a section of the device D of the invention. This figure also shows the longitudinal, transverse, and elevation axes X, Y, and Z of the vehicle in which the device D is disposed, which axes are mutually orthogonal in pairs.

A flexible tank 21 in the form of a rectangular parallelepiped is thus disposed in a vehicle in order to contain a liquid, such as water for example if the vehicle is a water-bombing helicopter.

The flexible tank 21 is provided with a top cushion 22, a bottom 23, and sides 24. It can be seen that in non-essential manner, the top cushion 22 projects over the sides 24 of the flexible tank.

In addition, an inflatable support belt 20 surrounds the flexible tank 22 to contribute to supporting it and in particular to stiffening its sides.

Furthermore, the flexible tank 21 includes an anti-sloshing device D.

The device D is provided with first and second ties 1 and 2, e.g. straps, holding the top cushion 22 in an (X,Y) plane defined by the longitudinal and transverse axes X and Y of the vehicle.

The first and second ties 1 and 2 are secured respectively to first and second edges 221 and 222 of the top cushion, the first edge 221 being opposite from the second edge 222. More precisely, since the top cushion 22 projects from the sides 24 of the flexible tank 21, the first and second ties 1 and 2 are connected to projecting portions of the first and second edges 221 and 222. This makes it easier to connect the ties to the edges of the cushion. Nevertheless, the projecting configuration of the top cushion merely constitutes a seventh variant amongst the embodiments of the invention, with the ties 1 and 2 nevertheless remaining fastened to the top cushion 22 independently of the dimensions of the top cushion 22.

Furthermore, the device has deflector means R for controlling the paths followed by the ties 1 and 2.

Figure 3:
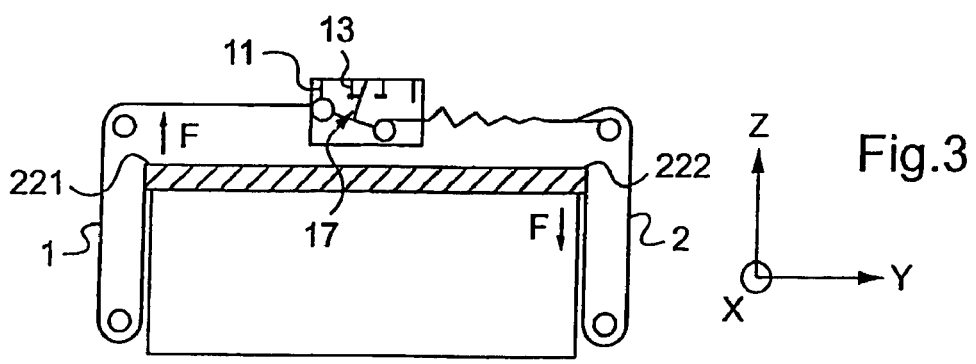
FIG. 3 is a section explaining the operation of the main distributor means in a first embodiment.
Figure 5:
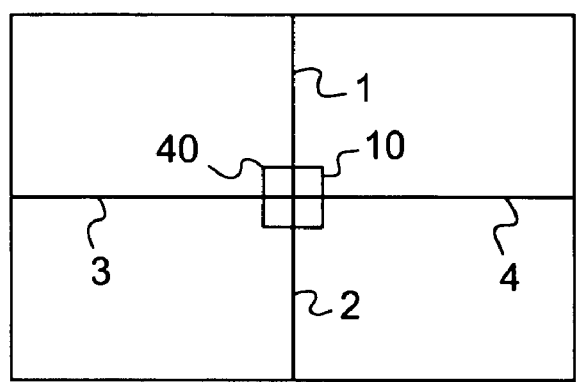
FIG. 5 is a plan view of the device showing the second and fifth variants of the embodiments.
Figure 5:
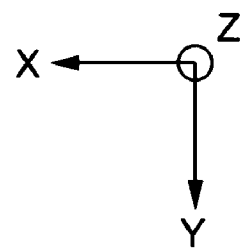

With reference to FIGS. 1, 3, and 5, in particular, in a first embodiment, the end zones 1' and 2' of the first and second ties 1 and 2 are fastened to the top cushion 22, from which top cushion 22 they extend towards the bottom 23 of the tank 1.

Figure 4:
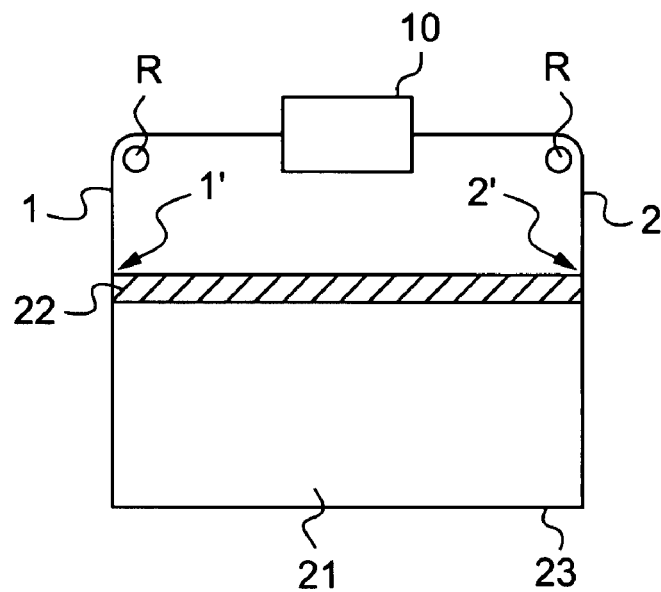
FIG. 4 is a section of the device in a second embodiment of the invention.

In contrast, with reference to FIG. 4, in a second embodiment, the end zones 1' and 2' of the first and second ties 1 and 2 that are fastened to the top cushion 22, leave the top cushion 22 going away from the bottom 23 of the tank 1.

Furthermore, the deflector means R are optionally also used so that the end zones 1' and 2' of the first and second ties 1 and 2 are perpendicular to the horizontal surface 22' of the top cushion 22, said surface facing the bottom 23 of the tank. This disposition significantly increases the effectiveness of the device.

The surface 22' is said to be horizontal insofar as it is parallel to the (X,Y) plane of the vehicle which defines the horizontal while the elevation axis Z defines the vertical.

Each tie 1, 2 has one end zone 1', 2' secured to the top cushion 22, while its other end is secured to main distributor means 10.

The main distributor means comprise blocker means 11, 12, brake means 13, 14, and a pendular support 17 having a horizontal shaft that is provided with automatic winders 18, 19.

To optimize the device D, the first and second edges 221 and 222, the first and second ties 1 and 2, the distributor means R, the first and second automatic winder means 18 and 19, the blocker means 11, 12, and the brake means 13, 14, and indeed the horizontal shaft 16, are arranged substantially on a common axis, said axis being parallel either to the longitudinal axis X or to the transverse axis Y. In addition, the pendular support is provided with a vertical shaft 15 that, at rest, constitutes a vertical axis of symmetry for the device D, with the first and second edges 221 and 222 being arranged symmetrically about said vertical shaft 15, by way of example in the second variant of the invention.

Figure 2:
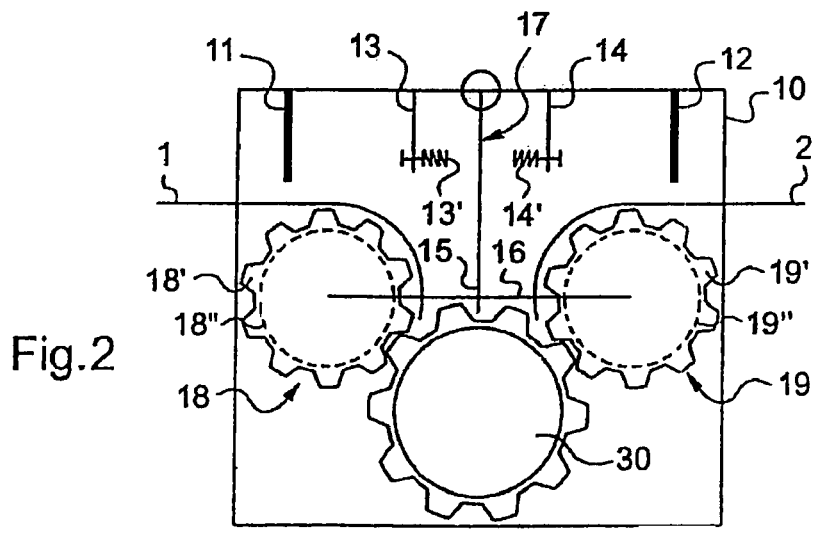
FIG. 2 is a section of the main distributor means.

FIG. 2 shows the main distributor means 10 in greater detail.

It comprises a pendular support 17 in the form of an upside-down T-shape that is provided with a vertical shaft 15 and with a horizontal shaft 16, the vertical shaft 15 being secured to the middle of the horizontal shaft 16.

In addition, first and second automatic winders 18 and 19, for winding the first and second ties 1 and 2 respectively, are disposed at the free ends of the horizontal shaft 16 of the pendular support 17 in such a manner as to be arranged symmetrically about the vertical shaft 15. The larger-diameter peripheries 18', 19' of the first and second automatic winders 18 and 19 are cogged, while their smaller-diameter peripheries 18", 19" are secured to the first and second ties 1 and 2.

The first and second automatic winders 18 and 19 rotate in opposite directions. The first automatic winder 18 tends to turn clockwise to wind in the first tie 1 if the tension exerted thereon is below a given threshold that is adjustable, while the second automatic winder 19 turns counterclockwise to wind in the second tie 2 if the tension exerted thereon is below said given threshold. Consequently, when the top cushion 22 is pressed against the liquid, the tension exerted on the first and second ties 1 and 2 increases until it reaches said given threshold. At that point the first and second automatic winders 18 and 19 can no longer wind in the first and second ties 1 and 2 which are thus under tension.

In contrast, if the tension exerted on the ties is sufficient, then the first and second automatic winders 18 and 19 allow the ties to be wound out.

Furthermore, the first and second winders 18 and 19 co-operate with each other via gearing interconnecting the winders 18 and 19, for example. Consequently, either both automatic winders 18 and 19 are winding the ties in, or are winding the ties out, or else neither of the winders 18, 19 is winding the ties in or out.

In a variant of the invention, the main distributor means 10 includes a winding-out limiter 30 that co-operates with the first and second automatic winders 18 and 19 to limit the angular displacement of the winders 18, 19, i.e. to limit their rotation about their axes of rotation. Such a winding-out limiter 30, e.g. a cogwheel having abutments that co-operate with the larger-diameter periphery 18', 19' of the winders 18, 19, can be of use in particular for reducing the volume of the flexible tank 21.

Consequently, the main distributor means control the lengths of the ties in a purely mechanical manner to keep the horizontal surface 22' in a given position so that a sudden movement of the vehicle does not lead to a sloshing effect. By keeping the top cushion 22 horizontal in the frame of reference of the vehicle, by means of the ties and the winders, the main distributor means prevent the liquid from moving.

As a result, the main distributor means 10 includes blocker means for blocking one of the first and second ties 1 and 2 if a large movement of the liquid contained in the flexible tank 21 is tending to induce a large movement of the first and second edges of the top cushion 22. Such a movement is said to be large if it causes the top cushion 22 to be inclined relative to the bottom 23 by an amount exceeding 5°.

The blocker means then comprise a first stationary abutment 11 co-operating with the first-automatic winder 18 to block winding out of the tie 1, if necessary, and a secondary stationary abutment 12 that co-operates with the second automatic winder 19 to block winding out of the second tie 2.

Nevertheless, the liquid can be allowed to make movements that are small, i.e. that induce the top cushion 22 to incline relative to the bottom of the tank by no more than about 5°, where such movements do not amount to sloshing. Under such circumstances, it is not necessary to block a tie.

In a first variant of the invention, the main distributor means 10 are then provided with brake means 13, 14 acting on the pendular support so that the first and second automatic winders 18 and 19 cannot co-operate with the blocker means.

First brake means 13 thus comprise a first spring 13' of mechanically adjustable stiffness that brakes the movement of the pendular support towards the first edge 221 of the top cushion 22. Only a large amount of movement can then lead to the first tie 1 being blocked temporarily.

Similarly, second brake means 14 are provided with a spring 14' of stiffness that is mechanically adjustable, that brakes the movement of the pendular support towards the second edge 222 of the top cushion 22.

Consequently, in a first embodiment, the device D operates as follows.

While the tank is being filled, the liquid exerts uniform pressure on the top cushion 22 which tends to rise vertically up the elevation axis Z. During this movement, the top cushion 22 exerts equivalent tension on each of the ties 1, 2 that is sufficient to enable the first and second winders 18 and 19 to wind said ties out, and thus allow the top cushion 22 to move upwards.

It should be observed that the use of a winding-out limiter 30 can put a limit on the volume of the tank 22.

Conversely, when the tank 21 is emptied, the liquid no longer exerts pressure on the top cushion 22, which then moves down uniformly under the effects of gravity and of the suction that is created in the tank under the effect of the tank being emptied. The first and second ties 1 and 2 are subjected to identical tensions, and the first and second winders 18 and 19 wind said ties in progressively as the top cushion moves downwards so that the first and second ties remain under tension. In contrast, with reference to FIG. 3, if the liquid moves a large amount during an intermediate stage or during the filling stage, that might lead to a sloshing phenomenon as represented by arrows F, e.g. having the effect of causing the first edge 221 to rise and the second edge 222 to move downwards.

However, under such circumstances, the tension exerted on the first tie 1 increases while that exerted on the second tie 2 decreases. The system is no longer balanced, and under the effect of this unbalance, the pendular support 17 moves towards the first edge 221, i.e. towards the edge that is tending to rise.

Given the tension being exerted, the brake means 13 cannot stop the stroke of the pendular support 17 which ends up by reaching the first stationary abutment 11 of the blocker means. On coming into contact with the first winder 18, this first abutment 11 then blocks the first winder 18 by mechanically interfering with a cog on the larger-diameter periphery 18'. The smaller-diameter periphery 18" of the first winder 18 is stationary relative to its larger-diameter periphery 18', so the smaller-diameter periphery 18" of the first winder is no longer capable of turning, thereby blocking the first tie and preventing it from being wound out.

With the first tie 1 blocked, the first edge 221 of the top cushion 22 that is tending to rise ends up by being held substantially in its original position. Clearly the same applies for the top cushion as a whole which stays in position and thus prevents the sloshing phenomenon from appearing.

With reference to FIG. 4, in a second embodiment, the end zones 1 and 2' of the first and second ties 1 and 2 both extend away from the bottom 23 of the tank 21.

Consequently, the main distributor means 10 will counter any sloshing phenomenon that appears during an emptying stage.

The main distributor means 10 operate in the same manner as in the first embodiment. The blocker means will block the automatic winder that is tending to wind out its tie under the effect of the edge to which it is connected moving, i.e. the edge of the top cushion 22 that is going down.

In a fourth variant of the embodiment, the device D has only one main distributor means.

Nevertheless, in a fifth variant of the embodiment, shown diagrammatically in FIG. 5, the device D has a secondary distributor means 40 identical to the main distributor means, so that the device is effective on two axes.

The secondary distributor means are then connected to third and fourth ties, themselves connected to opposite edges of the top cushion 22.

The secondary distributor means 40 and the third and fourth ties 3 and 4 are disposed along a longitudinal axis X that is perpendicular to the transverse axis Y along which the main distributor means 10 and the first and second ties 1 and 2 are disposed.

The main and secondary distributor means 10 and 40 may be constituted by a single unit, with the pendular support then having two horizontal arms and being secured to the distributor means via a ball joint, for example.

Naturally, the present invention can be the subject of numerous variations as to its implementation. Although several embodiments are described above, it will readily be understood that it is not conceivable to identify exhaustively all possible embodiments. It is naturally possible to envisage replacing any of the means described by equivalent means, without thereby going beyond the ambit of the present invention.

The invention claimed is:

1. A device for opposing sloshing in a flexible tank having a top cushion, a bottom, and a plurality of sides, the device comprising:
   first and second ties, each of said first and second ties having a cushion end and a distributor end wherein the cushion ends are secured respectively to first and second edges of said top cushion, said first edge being opposite the second edge, and
   main distributor means including first and second automatic winders wherein respective distributor ends of said first and second ties are fastened to one of said first and second automatic winders, wherein movement of said top cushion exerts a tension on said first and second ties and said main distributor means is capable of blocking movement of one of said ties when the tension exerted on that tie is greater than the tension exerted on the other tie, while allowing movement of the other tie.

2. A device according to claim 1, wherein the first and second automatic winders co-operate with each other.

3. A device according to claim 1, wherein the first and second automatic winders wind in opposite directions, one automatic winder turning counterclockwise to wind in the tie to which it is connected, while the other automatic winder turns clockwise to wind in the tie to which it is connected.

4. A device according to claim 1, wherein each automatic winder is provided with a smaller-diameter periphery and a larger-diameter periphery, and the larger-diameter peripheries of the first and second automatic winders being cogged.

5. A device according to claim 1, wherein for each automatic winder having a smaller-diameter periphery and a larger-diameter periphery, said first and second ties are arranged on the smaller-diameter peripheries of the first and second automatic winders, respectively.

6. A device according to claim 1, wherein said first and second automatic winders are arranged on a pendular support in the form of an upside-down T-shape, said pendular support being provided with a vertical shaft fitted with a horizontal shaft with said first and second automatic winders disposed at the free ends thereof.

7. A device according to claim 6, wherein said first and second automatic winders are disposed symmetrically around said vertical shaft.

8. A device according to claim 6, wherein said main distributor includes blocker means for blocking the automatic winder connected to the edge of said cushion that is tending to make a large movement under the effect of movement of the liquid contained in said tank.

9. A device according to claim 8, wherein said large movement induces an inclination of said top cushion of more than 5° relative to said bottom.

10. A device according to claim 8, wherein, for said tank being subjected to three distinct stages, namely a filling stage, an emptying stage, and an intermediate stage between the filling and emptying stages, said main distributor means opposes a sloshing effect during the filling and intermediate stages, one of said first and second edges of said top cushion tending to rise during a large movement of the liquid contained in said tank, said blocker means blocking the automatic winder connected via a tie to the edge of said top cushion that is tending to rise under the effect of said movement of the liquid.

11. A device according to claim 10, wherein for each tie having a cushion end secured to said top cushion, said cushion extends away from said top cushion so as to go towards said bottom of said tank.

12. A device according to claim 8, wherein, for said tank being subjected to three distinct stages, namely a filling stage, an emptying stage, and an intermediate stage between the filling and emptying stages, said main distributor means opposes a sloshing effect during the emptying stage, one of said first and second edges of said top cushion tending to move down during a large movement of the liquid contained in said tank, said blocker means blocking the automatic winder connected via a tie to the edge of said top cushion that is tending to move down under the effect of said movement of the liquid.

13. A device according to claim 12, wherein, for each tie having a cushion end secured to said top cushion, said cushion extends away from said cushion towards said bottom of said tank.

14. A device according to claim 8, wherein said blocker means includes a first stationary abutment that co-operates with said first automatic winder when said pendular support pivots under the effect of the tension exerted on the first tie, said tension being greater than the tension exerted on the second tie.

15. A device according to claim 14, wherein, for said first automatic winder having a cogged larger-diameter periphery, said first abutment blocks the first automatic winder by coming into contact with a cog of said cogged larger-diameter periphery.

16. A device according to claim 8, wherein said blocker means includes a second stationary abutment that co-operates with said second automatic winder when said pendular support pivots under the effect of the tension exerted on the second tie, said tension being greater than the tension exerted on the first tie.

17. A device according to claim 16, wherein, for said second automatic winder having a cogged larger-diameter periphery, said second stationary abutment blocks the second automatic winder by coming into contact with a cog of said cogged larger-diameter periphery.

18. A device according to claim 6, wherein said main distributor means include brake means for braking said pendular support to avoid a winder being blocked by a blocker means if the liquid contained in said tank moves by a small amount.

19. A device according to claim 18, wherein the liquid contained in said tank is said to move by a small amount when the inclination it induces in said top cushion relative to the bottom of said tank is less than approximately 5°.

20. A device according to claim 18, wherein said brake means includes a first spring of adjustable stiffness to brake the movement of the pendular support towards said first edge.

21. A device according to claim 18, wherein said brake means includes a second spring of adjustable stiffness for braking the movement of the pendular support towards said second edge.

22. A device according to claim 1, including a wind-out limiter that co-operates with the first and second automatic winders to reduce any vertical displacement of said top cushion.

23. A device according to claim 1, wherein said first and second edges of the top cushion are disposed symmetrically relative to said main distributor means.

24. A device according to claim 1, wherein said first and second edges of the top cushion are disposed asymmetrically relative to said main distributor means.

25. A device according to claim 1, wherein, for the device being arranged on an aircraft provided with a nose and a tail, the main distributor and the first and second ties are arranged on a longitudinal axis passing through said nose and said tail, or on a transverse axis perpendicular to said longitudinal axis.

26. A device according to claim 1, wherein, for said device including secondary distributor means connected to third and fourth ties secured respectively to opposite edges of said cushion, said secondary distributor means being identical to said main distributor means, the secondary distributor means and the third and fourth ties are disposed on an axis perpendicular to the transverse axis on which the main distributor means and the first and second ties are disposed.

27. A device according to claim 1, including deflector means serving to control the paths followed by said ties.

28. A device according to claim 1, wherein, for said tank being subjected to three distinct stages, namely a filling stage, an emptying stage, and an intermediate stage between the filling and emptying stages, said device includes at least one main distributor means for opposing a sloshing effect during the filling and intermediate stages, together with at least one main distributor means for opposing a sloshing effect during the emptying stage.

29. A device according to claim 1, wherein for said top cushion projecting from said sides of said tank, said first and second ties are connected to portions of said top cushion that project from said tank.

* * * * *